United States Patent
Lo et al.

(10) Patent No.: US 6,275,162 B1
(45) Date of Patent: Aug. 14, 2001

(54) METHOD OF DISPLAYING CAPACITY USING LEDS OF THE NOTEBOOK COMPUTER SYSTEM AND THE DEVICE OF THE SAME

(75) Inventors: Sheng-Hsin Lo; Ming-Yuan Liu, both of Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/695,384

(22) Filed: Oct. 25, 2000

(51) Int. Cl.$^7$ .................................................. G08B 21/00
(52) U.S. Cl. .................. 340/636; 340/691.1; 340/691.3; 340/815.4; 320/FOR 147; 713/340
(58) Field of Search .................... 340/636, 691.1, 340/691.3, 815.4; 320/FOR 147; 713/340

(56) References Cited

U.S. PATENT DOCUMENTS

| | | | |
|---|---|---|---|
| 5,553,294 | * | 9/1996 | Nanno et al. .......................... 713/340 |
| 5,621,299 | * | 4/1997 | Krall ........................................ 320/5 |
| 5,914,853 | * | 6/1999 | Motoe et al. .......................... 361/680 |
| 6,015,698 | * | 2/2000 | Kim et al. .............................. 320/132 |
| 6,137,677 | * | 10/2000 | Ganthier et al. ...................... 361/683 |

* cited by examiner

Primary Examiner—Julie Lieu
(74) Attorney, Agent, or Firm—Birch, Stewart, Kolasch & Birch, LLP

(57) ABSTRACT

A method of displaying the battery capacity using LEDs of the notebook computer system and the device of the same, which displays the battery capacity by depressing a lid switch and through the signal transmission of a keyboard controller (KBC) and a SMB bus.

15 Claims, 5 Drawing Sheets

METHOD OF DISPLAYING CAPACITY USING LEDS OF THE NOTEBOOK COMPUTER SYSTEM AND THE DEVICE OF THE SAME

BACKGROUND OF THE INVENTION

1. Field of Invention

The present invention relates to a method of displaying the battery capacity of the notebook computer system and the device of the same and, in particular, to a method of displaying the battery capacity using, LEDs of the notebook computer system and the device of the same.

2. Related Art

Nowadays, carrying a portable computer for either business or personal uses has become a popular trend. Thus, computer manufacturers further minimize portable computers to be notebook computers with an area about that of a notebook. Its functions are basically the same as a desktop computer but can be put into a suitcase or a backpack to satisfy the needs of businessmen.

The power supply of a notebook computer is mainly a NiMH or NiCd battery. Better models are usually equipped with a Li-ion battery with better capacity and no memory effects, which can last about 3 to 4 hours. Some models can even last for more than 10 hours. For businessmen who travel frequently the notebook computer with a good battery that can last for a long time is a very convenient tool for them to work while taking a public transportation.

Currently the rechargeable battery of a notebook computer is provided with an LED for showing the user the battery capacity. To accommodate the LED in the battery, the following factors should be taken into account:

1. The cost for five LEDs, the extra area occupied by the LEDs and the cost for a push switch have to be considered.
2. Some space in the battery pack is occupied by the LEDs.
3. The problems such as assembling time, bard yield, warranty services and stock items have to be considered.
4. Sometimes one has to take out the battery to check the LED display due to the structure. If the battery is being recharged and the temperature is higher than 40° C., unplugging may result in incorrect warning of over-temperature charging and cause the recharging process to temporarily stop (erratic charging of a NiMH battery is determined according to the temperature).
5. If one wants to know the capacity of the battery while starting the operating or suspending and the battery is not provided with a corresponding LED, then the user has to wait until the computer is on and to use a program to read the battery capacity. This is very inconvenient.
6. If two batteries are installed in the computer at the same time, it would be better if the average battery capacity can be displayed by simply depressing a lid switch without taking out the two batteries and estimating the average on one's own.

SUMMARY OF THE INVENTION

Using existingy five LEDs in a notebook computer system, namely, those for the hard disk drive (HDD), the floppy disk drive (FDD), the SCROLL LOCK, the CAPS LOCK and the NUM LOCK, by depressing a lid switch and through the signal transmission of a keyboard controller (KBC) and an SMB bus, the present invention can replace the original LED display for showing the battery capacity.

It is a primary object of the invention to achieve the goal of displaying the battery capacity without requiring extra costs for additional LEDs and a push switch. In particular, the user can learn the battery capacity without taking out the battery while the computer is off or in the suspend state.

Other features and advantages of the present invention will be apparent from the following detailed description which proceeds with reference to the accompanying drawings.

BRIEF DESCRIPTION OF THE DRAWINGS

In the various drawings, the same references relate to the same elements.

DETAILED DESCRIPTION OF THE INVENTION

Figure 1:
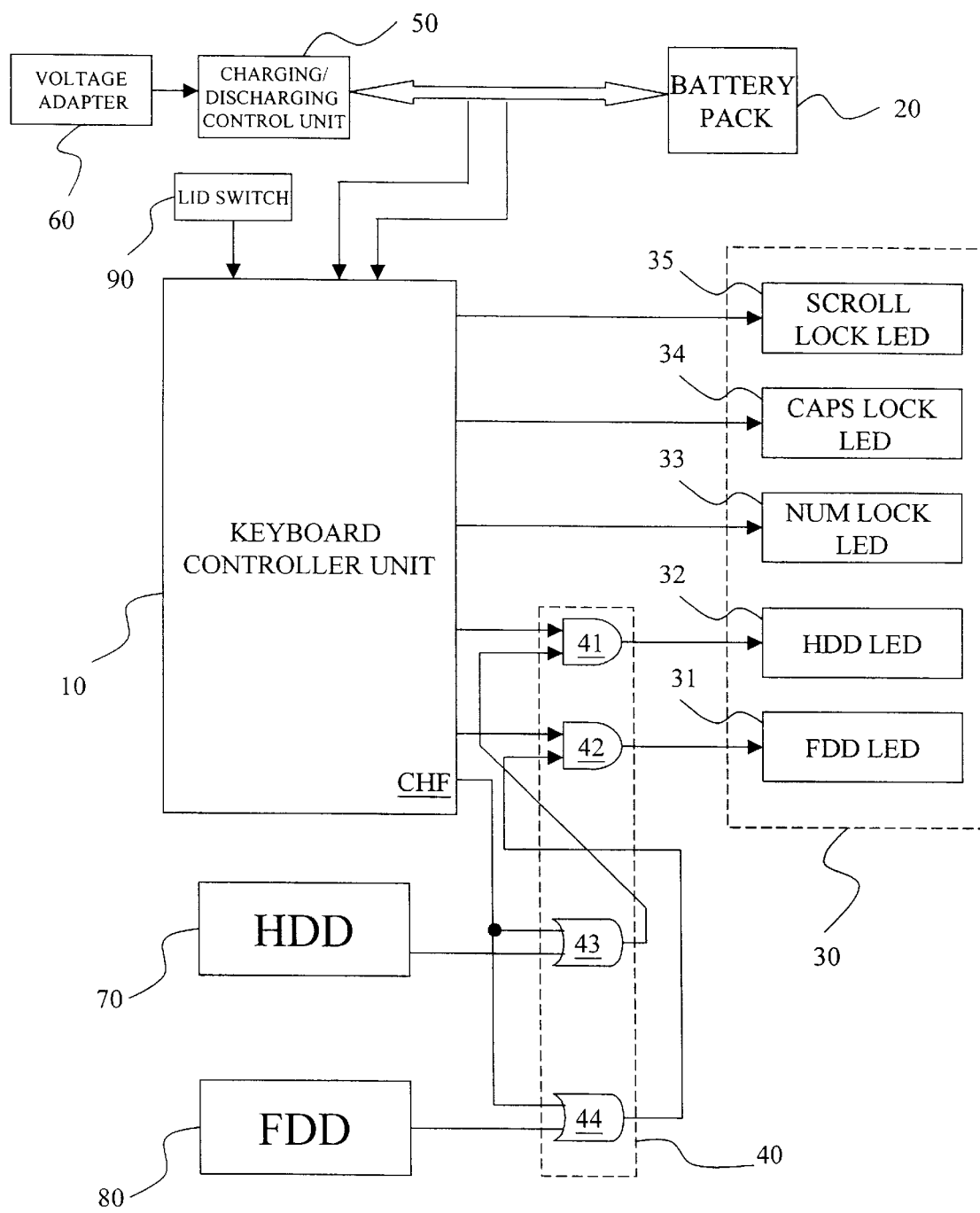
FIG. 1 is a block diagram of a circuit of the present invention to display the battery capacity Lising the LEDs of a notebook computer system.

The present invention provides a method of displaying the battery capacity of the notebook computer system and the device of the same. FIG. 1 is a block diagram of a circuit of the present invention to display the battery capacity using the LEDs of a notebook computer system. The circuit comprises a keyboard controller (KBC) unit 10 for controlling the keyboard and the LEDs, a battery pack 20 which communicates with the KBC 10 through an SMB bus. The battery pack 20 couples the signals of the positive pole the negative pole, the time pulse, data and temperature detection to external devices through a logic board (not shown), wherein the time pulse and data are sent to the KBC 10 for displaying the battery capacity.

The present invention uses the existing LED module 30 of the notebook computer system to display the battery capacity. The LED module 30 comprises a floppy disk drive (FDD) LED 31, a hard disk drive (HDD) LED 32, a NUM LOCK LED 33, a CAPS LOCK LED 34 and a SCROLL LOCK LED. The HDD 70 and the FDD 80 couple to the HDD LED 32 and the FDD LED 31, respectively, through a logic unit 40 (including a first logic gate 41, a second logic gate 42, a third logic gate 43, a fourth logic gate 44). A charging/discharging control unit 50 controls charging/discharging of the battery, the status of the battery and capacity detection. A voltage adapter 60 converts the voltage to +5V. The HDD 70 connects with the first logic gate 41 and the third logic gate 43 (which can be AND and OR gates). According to the present invention, its LED will be on when the battery capacity is between 20% and 39%. The FDD 80 connects with the second logic gate 42 and the fourth logic gate 44 (which can be AND and OR gates). According to the present invention, its LED will be on when the battery capacity is between 0% and 19%.

The main working principle of the disclosed method of displaying the battery capacity using LEDs of a notebook computer system is to use a lid switch 90 as the switch for displaying the battery capacity and to preserve the power management function of the system.

Figure 2:
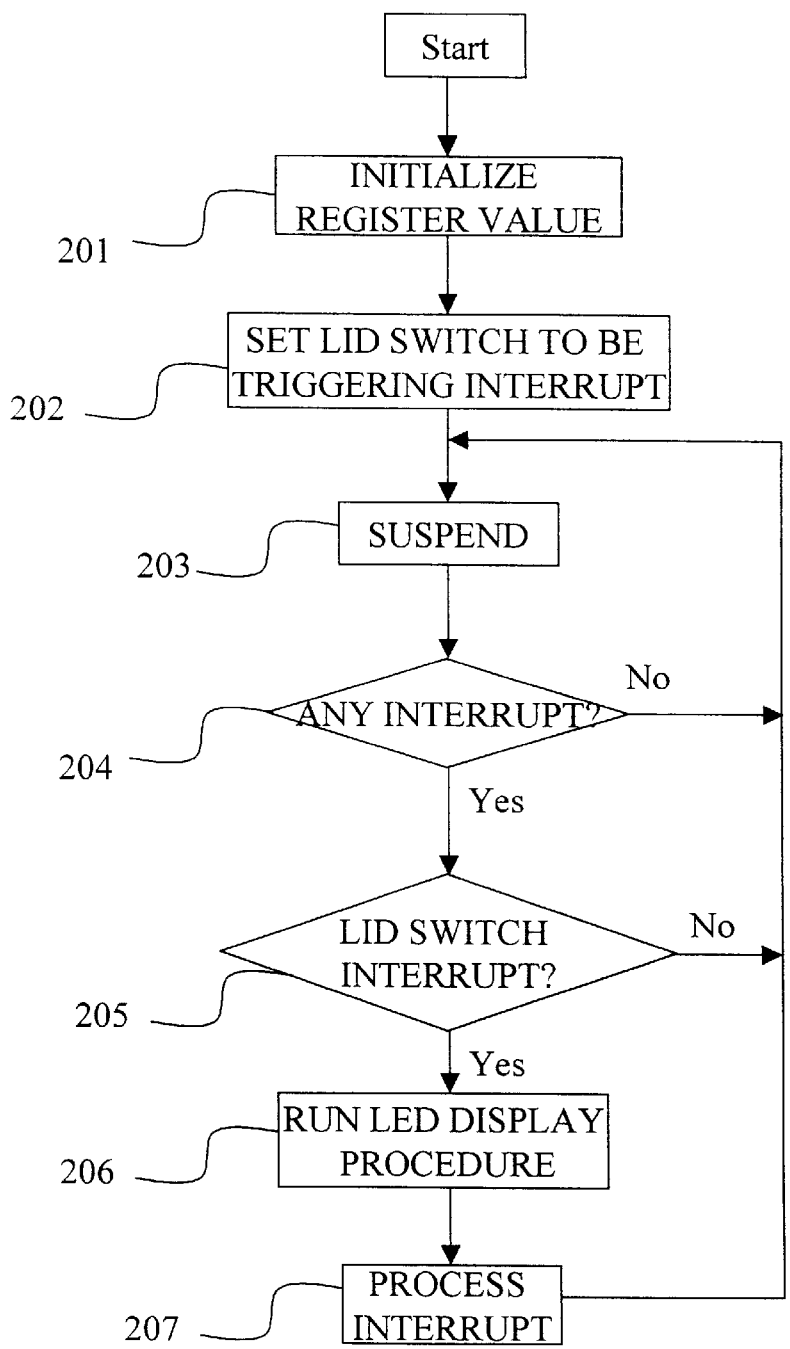
FIG. 2 is a flow chart of a method of the present invention to display the battery capacity using the LEDs of a notebook computer system.

To summarize, the present invention uses an LED display sub-routine to display the battery capacity. FIG. 2 is a flow chart of a method of the present invention to display the battery capacity using the LEEDs of a notebook computer system. The procedure is described as follows:

First, the system initializes a register value (step 201) and then set the lid switch to be triggering interrupt (step 202). Since the lid switch 90 is for the power management of the system, the program design does not only need to preserve its existing, function but also has to include the function of a switch for displaying the battery capacity and setting parameters for other functions. After entering the suspend state (step 203), the system determines whether any interrupt occurs (step 204). If there is no interrupt, it stays in the suspend state (step 203). If the lid switch interrupt occurs, the system than runs an LED display procedure (step 206), whose detailed steps are shown in FIGS. 3 and 4, processes other interrupts (step 207) and returns to the suspend state (step 203) to wait for the next interrupt.

To use the LEDs of a notebook system to display different battery capacities, the present invention provides an explicit embodiment to explain how to implement the battery capacity display. It is emphasized that the embodiment provided herein is only an example and should not be used to limit other display means for displaying different battery capacities.

Figure 3:
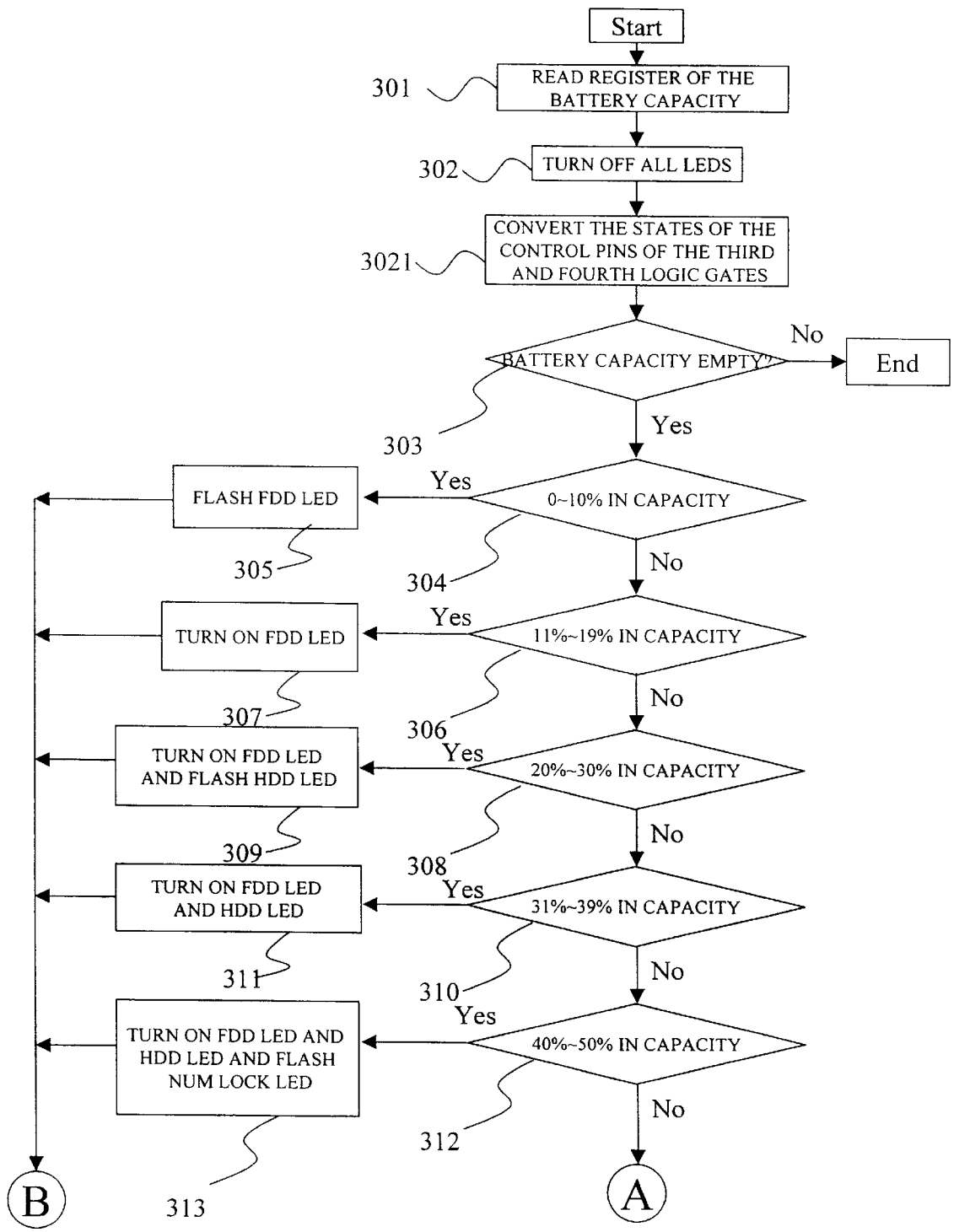
FIGS. 3 and 4 are flow charts of a method of the present invention to display the capacities of different batteries using the LEDs of a notebook computer system.
Figure 4:
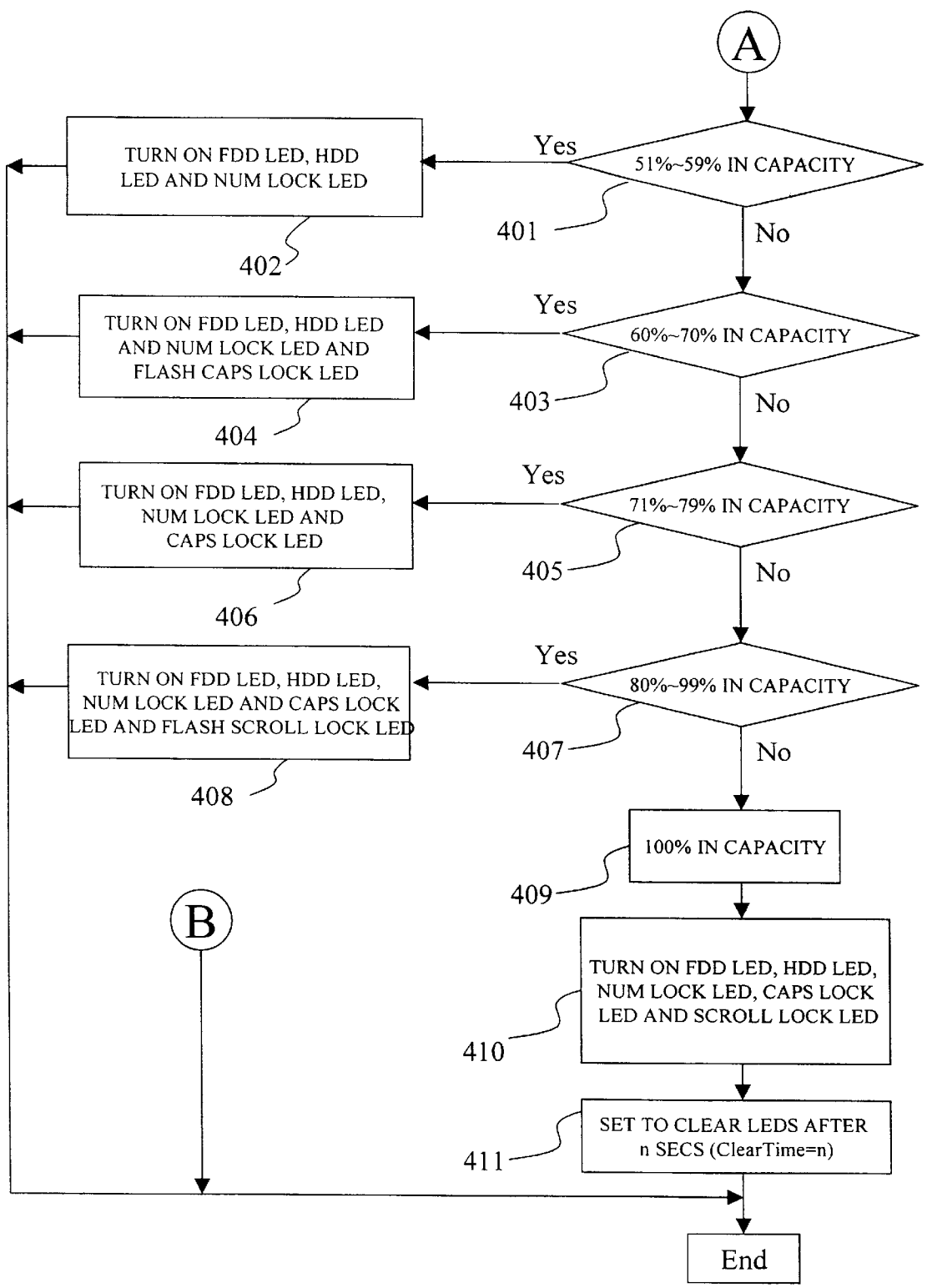

FIGS. 3 and 4 are flow charts of a method of the present invention to display the capacities of different batteries using the LEDs of a notebook computer system. When the LED display procedure starts, the battery capacity register is read by the system (step 301) and all LEDs are turned off (step 302). The control pins (CHF) of the third and fourth logic gates are changed in the logic states (step 3021) to temporarily stop the action signals of the HDD and the FDD. The system then determines whether the battery capacity is empty (step 303). If it is empty, the procedure finishes.

Otherwise, the system performs a series of determination procedures to check the battery capacity. It first checks if the capacity is between 0% and 10% (step 304). If the capacity is determined to be between 0% and 10%, then the FDD LED flashes (step 305). If the capacity is over 10%, then the system checks if the capacity is between 11% and 19% (step 306). If the capacity is determined to be between 11% and 19%, then the FDD LED is turned on (step 307). If the capacity is over 19%. then the system checks if the capacity is between 20% and 30% (step 308). If the capacity is determined to be between 20% and 30%, then the FDD LED is turned on and the HDD LED flashes (step 309). If the capacity is over 30%. then the system checks if the capacity is between 31% and 39% (step 310). If the capacity is determined to be between 31% and 39%, then both the FDD LED and the HDD LED are turned on (step 311). If the capacity is over 39%, then the system checks if the capacity is between 40% and 50% (step 312). If the capacity is determined to be between 40% and 50%, then both the FDD LED and the HDD LED are turned on and the NUM LOCK LED flashes (step 313).

If the capacity is over 50%. then the system continues to run step A in FIG. 4. The system checks if the capacity is between 51% and 59% (step 401). If the capacity is determined to be between 51% and 59%, then all the FDD, HDD and NUM LOCK LEDs are turned on (step 402). If the capacity is over 59%, then the system checks if the capacity is between 60% and 70% (step 403). If the capacity is determined to be between 60% and 70%, then all the FDD, HDD and NUM LOCK LEDs are turned on and the CAPS LOCK LED flashes (step 404). If the capacity is over 70%. then the system checks if the capacity is between 71% and 79% (step 405). If the capacity is determined to be between 71% and 79%. then all the FDD. HDD, NUM LOCK, and CAPS LOCK LEDs are turned on (step 406). If the capacity is over 79%, then the system checks if the capacity is between 80% and 99% (step 407). If the capacity is determined to be between 80% and 99%, then all the FDD, HDD, NUM LOCK, and CAPS LOCK LEDs are turned on and the SCROLL LOCK LED flashes (step 408). If the capacity is determined to be 100% (step 409), then the all the FDD, HDD, NUM LOCK, CAPS LOCK, and the SCROLL LOCK LEDs are turned on (step 410).

It should be emphasized that the present invention set a clear time (ClearTime=n) so as to continue running procedure B to clear all LEDs after n seconds after turning on or flashing different LEDs according to different battery capacities (step 411).

Figure 5:
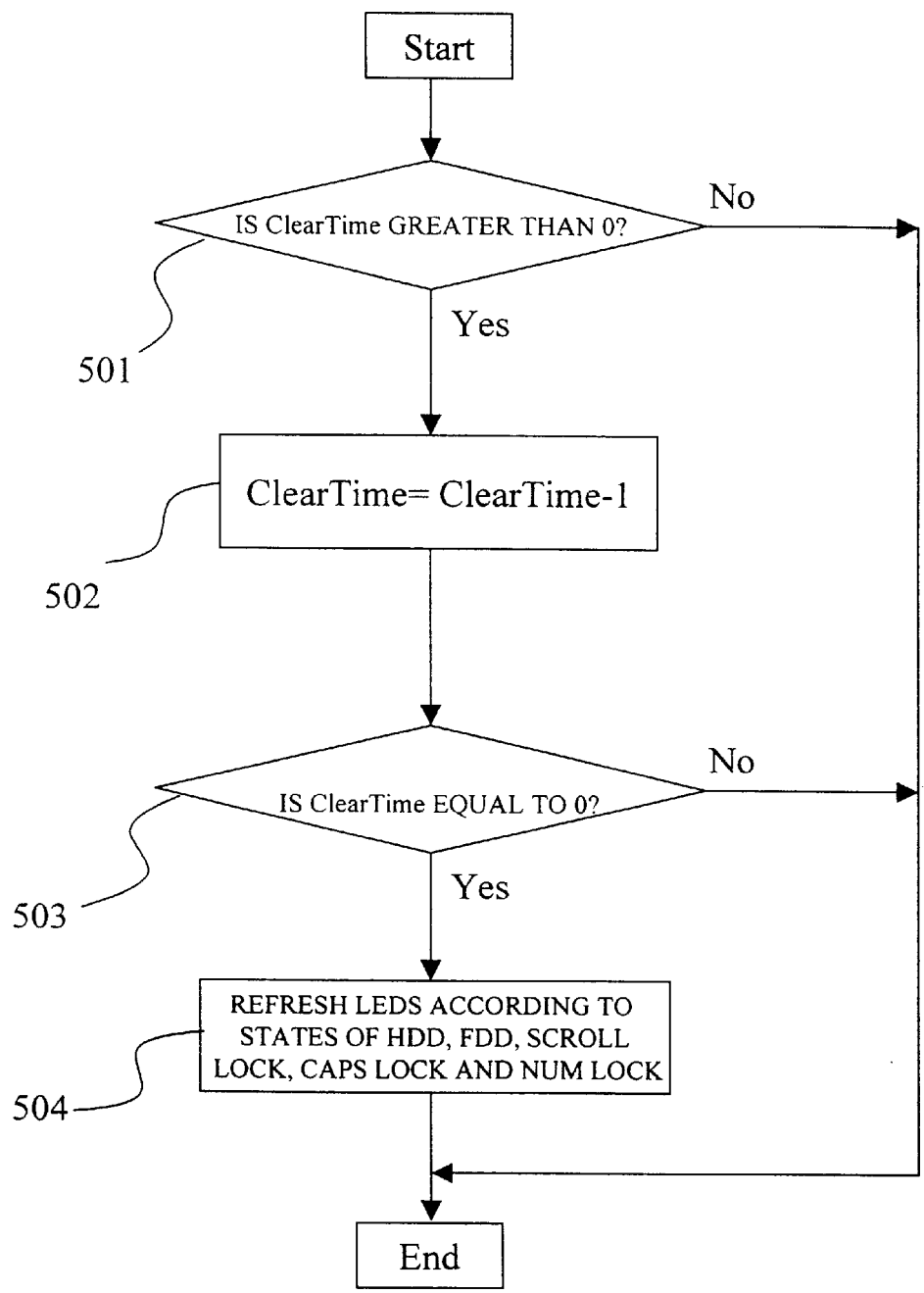
FIG. 5 is a flow chart of an interrupt-per-second sub-routine of the present invention to display the battery capacity using the LEDs of a notebook computer system.

FIG. 5 is a flow chart of an interrupt-per-second sub-routine of the present invention to display the battery capacity using the LEDs of a notebook computer system, which gives an explicit implementation for the above-described procedure. First, the system performs the following loop algorithm to ensure the light-up or flash time of the LEDs: make sure ClearTime is greater than 0 (step 501), set ClearTime=ClearTime−1 (step 502) each time until ClearTime reaches 0 (step 503). Finally, the system refreshes the LEDs according to the states of the HDD, FDD, SCROLL LOCK, CAPS LOCK and NUM LOCK.

ADVANTAGES OF THE PRESENT INVENTION

The present invention uses the existing, five LEDs (HDD, FDD, SCROLL LOCK, CAPS LOCK and NUM LOCK) in a notebook computer system, along with the depressing of a lid switch and through the signal transmission of a keyboard controller (KBC) and an SMB bus, to replace the original LED display for showing the battery capacity. Therefore, the battery capacity display can be achieved without the need to increase extra LED and lid switch costs.

Furthermore, the user can learn the battery capacity without taking the battery of the host machine when the machine is off or suspended. In particular, the battery charging will not stop when using the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of displaying the battery capacity using LEDs on a notebook computer system, the LEDs are being usable to indicate at least one of the actions of the computer drives and keyboard functions, which comprises the steps of:

transmitting the battery capacity message through an SMB bus to a keyboard controller (KBC) unit;

providing a sub-routine, which switches from the power management function to the battery capacity display function through the control of a lid switch;

providing a logic unit that functions according to the control of the lid switch to temporarily stop the action signals of the hard disk drive (HDD) and the floppy disk drive (FDD); and displaying in different ways for different battery capacities using the LEDs.

2. The method according to claim 1, wherein the LEDs being selectable from the group comprising the FDD LED, the HDD LED, the NUM LOCK LED, the CAPS LOCK LED, and the SCROLL LOCK LED.

3. The method according to claim 1, wherein the battery capacity message refers to the pulse and data signals of the logic board provided in the battery pack.

4. The method according to claim 1, wherein the logic unit comprises a first logic gate and a third logic gate to temporarily stop the action signal of the HDD and to display the battery capacity.

5. The method according to claim 1, wherein the logic unit comprises a second logic gate and a fourth logic gate to temporarily stop the action signal of the FDD and to display the battery capacity.

6. The method according to claim 1, wherein the battery capacity is displayed via the step of temporarily stopping the action signals of the HDD and the FDD.

7. A method of displaying the battery capacity using LEDs on a notebook computer system, the LEDs are being usable to indicate at least one of the actions of the computer drives and keyboard functions, which comprises the steps of:

transmitting the battery capacity message through an SMB bus to a keyboard controller (KBC) unit;

providing a sub-routine, which switches from the power management function to the battery capacity display function through the control of a lid switch;

providing a logic unit that functions according to the control of the lid switch to temporarily stop the action signals of the hard disk drive (HDD) and the floppy disk drive (FDD); and displaying using the LEDs different battery capacities in the following ways:

flashing the FDD LED when the battery capacity is between 0 and 10%;

turning on the FDD LED when the battery capacity is between 11% and 19%;

turning on the FDD LED and flashing the HDD LED when the battery capacity is between 20% and 30%;

turning on both the FDD LED and the HDD LED when the battery capacity is between 31% and 39%;

turning on both the FDD LED and the HDD LED and flashing the NUM LOCK LED when the battery capacity is between 40% and 50%;

turning on all the FDD LED, the HDD LED and the NUM LOCK LED when the battery capacity is between 51% and 59%;

turning on all the FDD LED, the HDD LED and the NUM LOCK LED and flashing the CAPS LOCK LED when the battery capacity is between 60% and 70%;

turning on all the FDD LED, the HDD LED, the NUM LOCK LED and the CAPS LOCK LED when the battery capacity is between 71% and 79%;

turning on all the FDD LED, the HDD LED, the NUM LOCK LED and the CAPS LOCK LED and flashing the SCROLL LOCK LED when the battery capacity is between 80% and 99%; and turning on all the FDD LED, the HDD LED, the NUM LOCK LED, the CAPS LOCK LED and the SCROLL LOCK LED when the battery capacity is 100%.

8. The method according to claim 7, wherein the battery capacity message refers to the pulse and data signals of the logic board provided in the battery pack.

9. The method according to claim 7, wherein the logic unit comprises a first logic gate and a third logic gate to temporarily stop the action signal of the HDD and to display the battery capacity.

10. The method according to claim 7, wherein the logic unit comprises a second logic gate and a fourth logic gate to temporarily stop the action signal of the FDD and to display the battery capacity.

11. The method according to claim 7, wherein the battery capacity is displayed via the step of temporarily stopping the action signals of the HDD and the FDD.

12. A device of displaying the battery capacity using LEDs of a notebook computer system, which utilizes the existing five LEDs. i.e. the HDD, FDD, SCROLL LOCK, CAPS LOCK and NUM LOCK LEDs, of the notebook computer system, along with the depressing of a lid switch and the signal transmission of a keyboard controller (KBC) and an SMB bus, to display the battery capacity; wherein the device is characterized in that:

the device comprises a logic unit to function according to the lid switch to temporarily stop the action signals of the HDD and the FDD; and all the five LEDs are used to display different battery capacities.

13. The device according to claim 12 further comprising a charging/discharging control unit as the control device for charging/discharging the battery, the battery state and the capacity detection.

14. The device according to claim 12 further comprising a voltage adapter which converts the voltage to +5V.

15. The device according to claim 12, wherein the battery capacity is displayed via the step of temporarily stopping the action signals of the HDD and the FDD.

* * * * *